United States Patent
Duva et al.

(10) Patent No.: US 10,573,994 B2
(45) Date of Patent: Feb. 25, 2020

(54) BACKSHELL ASSEMBLY FOR BULKHEAD ELECTRICAL CONNECTOR

(71) Applicant: HAMILTON SUNDSTRAND CORPORATION, Charlotte, NC (US)

(72) Inventors: Conner Duva, Enfield, CT (US); Jorge E. Hidalgo, Suffield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 15/962,901

(22) Filed: Apr. 25, 2018

(65) Prior Publication Data
US 2019/0334281 A1 Oct. 31, 2019

(51) Int. Cl.
| | |
|---|---|
| H01R 4/38 | (2006.01) |
| H01R 13/622 | (2006.01) |
| B60R 16/02 | (2006.01) |
| H01R 13/502 | (2006.01) |
| H01R 13/639 | (2006.01) |
| H01R 13/6582 | (2011.01) |
| H01R 13/6593 | (2011.01) |

(52) U.S. Cl.
CPC ....... *H01R 13/622* (2013.01); *B60R 16/0215* (2013.01); *H01R 13/502* (2013.01); *H01R 13/6397* (2013.01); *H01R 13/6582* (2013.01); *H01R 13/6593* (2013.01)

(58) Field of Classification Search
CPC ............ H01R 13/5219; H01R 13/5205; H01R 13/622; H01R 13/6592; H01R 12/596
USPC .................... 439/320, 98, 275, 276
See application file for complete search history.

(56) References Cited

U.S. PATENT DOCUMENTS

| | | | | |
|---|---|---|---|---|
| 3,391,381 A | | 7/1968 | Livingston | |
| 3,613,048 A | * | 10/1971 | Brundza | H01R 13/523 439/275 |
| 3,646,496 A | * | 2/1972 | Williams | H01R 13/6582 439/462 |
| 3,992,773 A | * | 11/1976 | Duffner | H01R 9/032 29/862 |
| 4,243,290 A | * | 1/1981 | Williams | H01R 9/032 439/607.52 |

(Continued)

FOREIGN PATENT DOCUMENTS

| | | |
|---|---|---|
| DE | 9000794 | 3/1990 |
| GB | 1361492 | 7/1974 |
| GB | 2239358 | 6/1991 |

OTHER PUBLICATIONS

European Patent Office, European Search Report dated Aug. 21, 2019 in Application No. 19156503.5.

*Primary Examiner* — Hae Moon Hyeon
(74) *Attorney, Agent, or Firm* — Snell & Wilmer L.L.P.

(57) ABSTRACT

A backshell assembly for a bulkhead electrical connector includes a lug defining a central lug bore, a nut defining a central nut bore, and a ring defining a central ring bore. The lug is configured to be coupled to the bulkhead electrical connector, the nut is configured to be coupled to the lug, and the ring is configured to be retained by the nut at least partially within at least one of the central lug bore and the central nut bore. A wire assembly to be coupled to the bulkhead electrical connector includes electromagnetic shielding, and such electromagnetic shielding is configured to be electrically grounded to the bulkhead electrical connector via the backshell assembly.

16 Claims, 4 Drawing Sheets

(56) References Cited

U.S. PATENT DOCUMENTS

| | | | |
|---|---|---|---|
| 4,854,891 A | 8/1989 | Kamei et al. | |
| 5,052,947 A * | 10/1991 | Brodie | H01R 9/038 |
| | | | 439/578 |
| 5,468,161 A | 11/1995 | Wright | |
| 6,779,243 B2 | 8/2004 | Nakata | |
| 9,722,350 B1 * | 8/2017 | Baldwin | H01R 4/18 |
| 2014/0329399 A1 * | 11/2014 | Ohsumi | H01R 13/5202 |
| | | | 439/276 |
| 2016/0099527 A1 * | 4/2016 | Loveless | H01R 13/6592 |
| | | | 439/607.01 |

* cited by examiner

US 10,573,994 B2

BACKSHELL ASSEMBLY FOR BULKHEAD ELECTRICAL CONNECTOR

GOVERNMENT LICENSE RIGHTS

This invention was made with Government support under N00014-12-D-0372 and N00014-16-F-2009 awarded by the United States Navy. The Government has certain rights in this invention

FIELD

The present disclosure relates to electrical connection assemblies, and more particularly to backshell assemblies for bulkhead electrical connectors.

BACKGROUND

Electrical assemblies include components such as electrical connectors, electrically conductive wires (e.g., wire bundles, wire harnesses), and/or electric terminals, among others. Electrical assemblies are utilized in a variety of industries to electronically transmit electrical power and/or data. Bulkhead electrical connectors, for example, are connectors that are configured to electrically route power and/or data through a wall that otherwise separates and isolates two chambers. For example, a bulkhead electrical connector may be installed through an external housing of water vehicle, such as an aquatic drone or a ship, and electrical connectors, such as wires, may be coupled to the bulkhead electrical connector to route electric power and/or data from one or more components housed within the water vehicle to one or more components disposed outside of the housing, while still maintaining inboard/outboard fluid isolation.

SUMMARY

In various embodiments, the present disclosure provides a backshell assembly for a bulkhead electrical connector. The backshell assembly may include a lug defining a central lug bore, a nut defining a central nut bore, and a ring defining a central ring bore. The lug may be configured to be coupled to the bulkhead electrical connector, the nut may be configured to be coupled to the lug, and the ring may be configured to be retained by the nut at least partially within at least one of the central lug bore and the central nut bore. A wire assembly to be coupled to the bulkhead electrical connector may include electromagnetic shielding, and such electromagnetic shielding may be configured to be electrically grounded to the bulkhead electrical connector via the backshell assembly.

In various embodiments, the ring has a radially outward ring surface that is conical, the lug has a radially inward lug surface that is conical, and at least a portion of the electromagnetic shielding of the wire assembly is configured to be disposed between the conical, radially outward ring surface and the conical, radially inward lug surface. In various embodiments, the radially inward lug surface is a first radially inward lug surface, and the lug has a second radially inward lug surface that is threaded. The lug may also have a radially outward lug surface that is threaded. The nut may have a radially inward nut surface that is threaded, and the second radially inward lug surface may be configured to be threadably engaged with the bulkhead electrical connector. Also, the radially outward lug surface may be configured to be threadably engaged with the radially inward nut surface. In various embodiments, the nut may have a shoulder, and the shoulder may define an aperture that is an opening to the central nut bore. In various embodiments, a diameter of the aperture of the nut is less than a maximum external diameter of the ring.

Also disclosed herein, according to various embodiments, is an electrical connection assembly that includes a bulkhead electrical connector, a lug coupled to the bulkhead electrical connector, a nut coupled to the lug, and a ring. The lug may define a central lug bore, the nut may define a central nut bore, and the ring may define a central ring bore, with the ring being retained by the nut at least partially within at least one of the central lug bore and the central nut bore. The electrical connection assembly may also include a wire assembly that includes at least one wire electrically connected to the bulkhead electrical connector. The at least one wire extends through the central nut bore, the central ring bore, and the central lug bore, according to various embodiments. The wire assembly also includes electromagnetic shielding, and at least a portion of the electromagnetic shielding is directly engaged with and retained between the ring and at least one of the lug and the nut, according to various embodiments.

In various embodiments, the ring has a radially outward ring surface that is conical and the lug has a radially inward lug surface that is conical. In such embodiments, the portion of the electromagnetic shielding may be engaged and retained between the conical, radially outward ring surface and the conical, radially inward lug surface. In various embodiments, the radially inward lug surface is a first radially inward lug surface, and the lug has a second radially inward lug surface that is threaded. The lug may also have a radially outward lug surface that is threaded. The nut may have a radially inward nut surface that is threaded, and the second radially inward lug surface may be configured to be threadably engaged with the bulkhead electrical connector. Also, the radially outward lug surface may be configured to be threadably engaged with the radially inward nut surface. In various embodiments, the nut may have a shoulder, and the shoulder may define an aperture that is an opening to the central nut bore. In various embodiments, a diameter of the aperture of the nut is less than a maximum external diameter of the ring.

In various embodiments, the bulkhead electrical connector includes a central longitudinal axis. The central lug bore, the central ring bore, and the central nut bore may be coaxial with the central longitudinal axis. Further, the portion of the electromagnetic shielding may be situated to extend radially inward between an axially outward edge of the ring and the shoulder of the nut. Still further, the portion of the electromagnetic shielding may also extend axially outward through the aperture. In various embodiments, the ring is disposed within the central lug bore. In various embodiments, the ring is disposed within the central lug bore and within the central nut bore. In various embodiments, the portion of electromagnetic shielding is a section of electromagnetic shielding that has been pulled-back from being disposed around the at least one wire. In various embodiments, the at least one wire is a first wire of a plurality of wires, the section of the electromagnetic shielding is a first section of a plurality of sections disposed respectively around the plurality of wires, and the plurality of sections of electromagnetic shielding are directly engaged with and retained between the ring and at least one of the lug and the nut. In various embodiments, the plurality of sections of electromagnetic shielding are circumferentially distributed around the ring. The electrical connection assembly may include a potting material disposed around an interface between the at least one wire and a terminal of the bulkhead electrical connector.

Also disclosed herein, according to various embodiments, is a method of connecting a wire assembly to a bulkhead electrical connector. The method may include coupling a lug to the bulkhead electrical connector, wherein the lug defines a central lug bore. The method may also include inserting a wire of the wire assembly through a central nut bore of a nut, inserting the wire through a central ring bore of a ring, electrically connecting the wire to the bulkhead electrical connector, and positioning at least a portion of electromagnetic shielding of the wire assembly between the ring and at least one of the lug and the nut. Further, the method may include coupling the nut to the lug, thereby retaining the ring at least partially within at least one of the central lug bore and the central nut bore.

In various embodiments, coupling the nut to the lug includes applying a compressive force to the ring via the nut to pinch the portion of the electromagnetic shielding between the ring and at least one of the lug and the nut. In various embodiments, positioning the portion of the electromagnetic shielding includes pulling back a section of the electromagnetic shielding from around the wire. In various embodiments, positioning the portion of the electromagnetic shielding includes extending the portion of the electromagnetic shielding radially inward between an axially outward edge of the ring and a shoulder of the nut and extending the portion of the electromagnetic shielding axially outward through an aperture of the shoulder of the nut. In various embodiments, positioning at least a portion of electromagnetic shielding of the wire assembly between the ring and at least one of the lug and the nut is performed before coupling the nut to the lug.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1A:
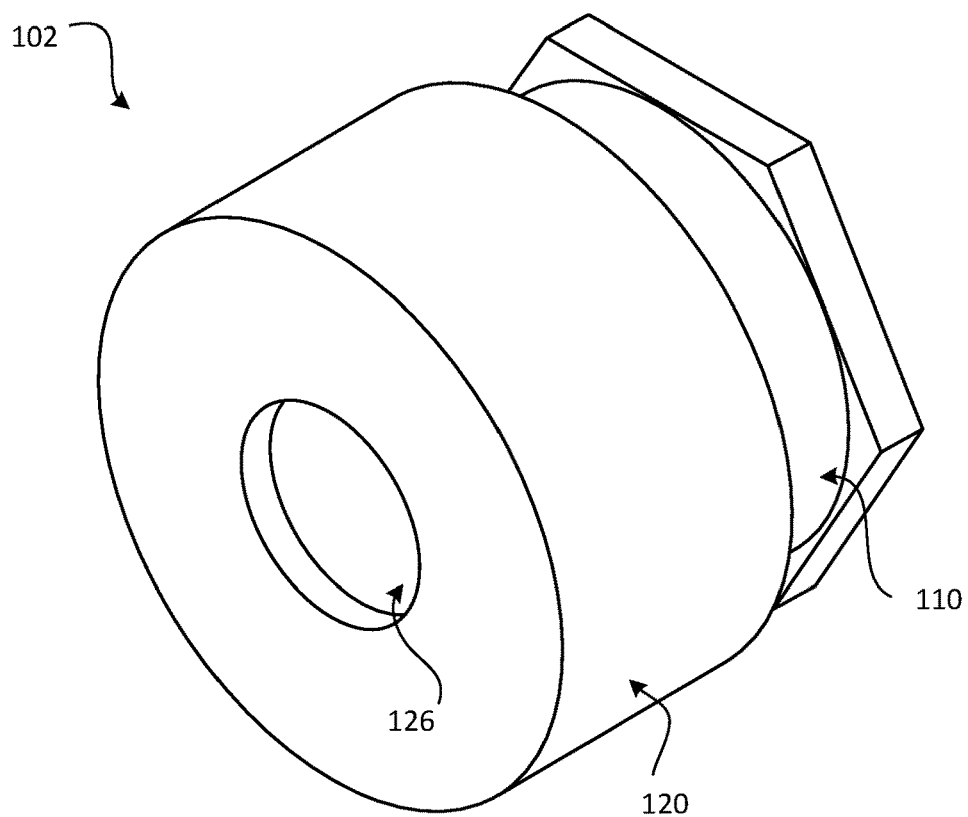
FIG. 1A illustrates a perspective view of a backshell assembly for a bulkhead electrical connector, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Figure 2:
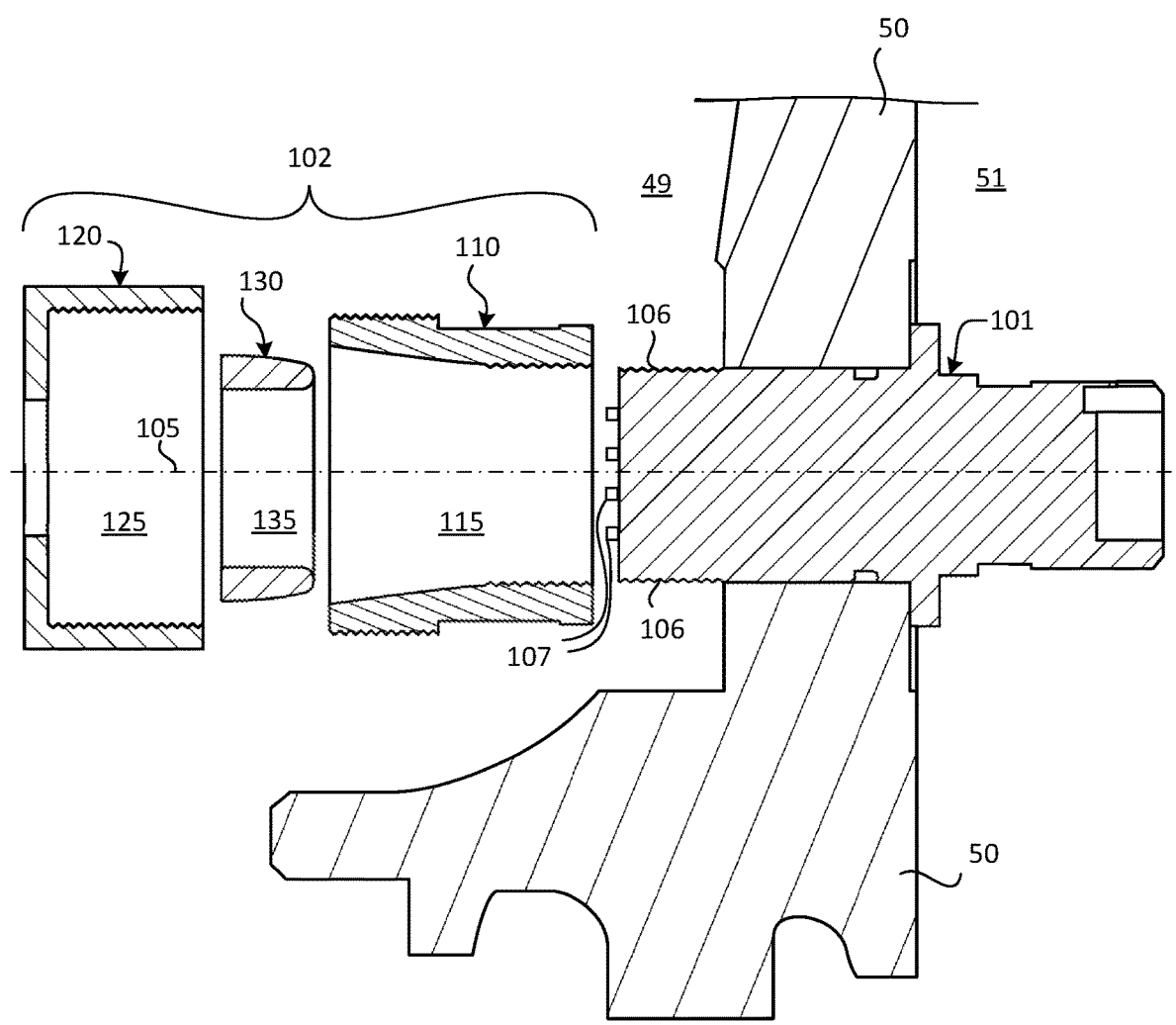
FIG. 2 illustrates a cross-sectional, exploded view of a backshell assembly and a bulkhead electrical connector, in accordance with various embodiments.
Figure 3:
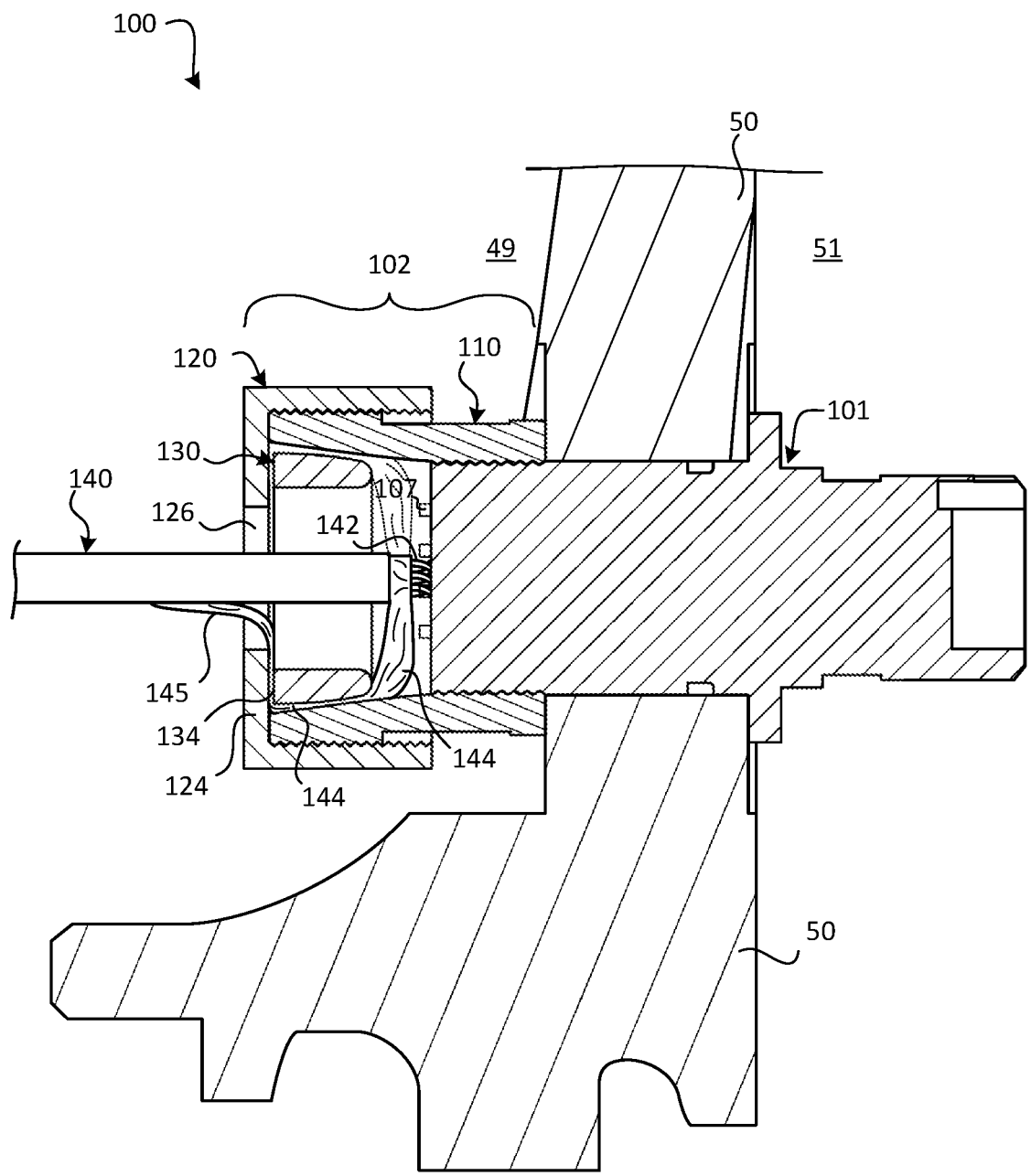
FIG. 3 illustrates a cross-sectional view of an electrical connection assembly, including a backshell assembly, a bulkhead electrical connector, and a wire assembly, in accordance with various embodiments.

Disclosed herein, according to various embodiments, is an electrical connection assembly that includes a backshell assembly for a bulkhead electrical connector. Also disclosed herein, according to various embodiments, is an associated method of connecting a wire assembly to a bulkhead electrical connector using a backshell assembly. As used herein, the term "bulkhead electrical connector" refers generally to a component that facilitates the routing of electrical power and/or data between isolated environments/chambers. That is, a bulkhead electrical connector is a component that traverses a chamber wall, such as wall 50 in FIGS. 2 and 3, wherein the wall 50 divides and separates two chambers within a device or that divides an internal chamber of a device/vehicle from an external/atmospheric environment. For example, a bulkhead electrical connector may be utilized in a water vessel, such as a manned water vehicle or an unmanned water drone, etc., to route electrical power and/or signals through the wall 50 (e.g., hull) between an internal chamber 49 and the external/atmospheric environment 51 (FIGS. 2 and 3). While details are included herein pertaining to water vehicles and/or water-bound devices, the electrical connection assembly disclosed herein, including the backshell assembly, may be implemented in other devices, vehicles, and systems.

Figure 1B:
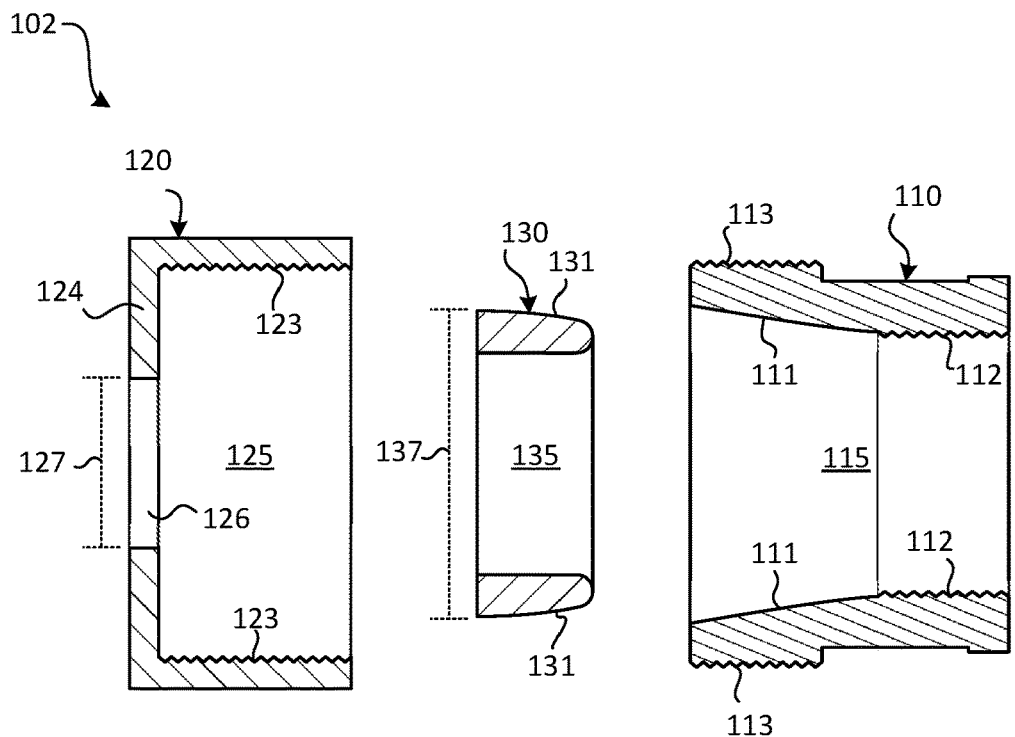
FIG. 1B illustrates a cross-sectional, exploded view of a backshell assembly for a bulkhead electrical connector, in accordance with various embodiments.

In various embodiments, and with reference to FIGS. 1A and 1B, a backshell assembly 102 is disclosed. The backshell assembly 102, according to various embodiments, and with reference to FIG. 3, is configured to be coupled to a bulkhead electrical connector 101 to facilitate coupling a wire assembly 140 to the bulkhead electrical connector 101. The combination of the backshell assembly 102, the bulkhead electrical connector 101, and the wire assembly 140 is referred to as the electrical connection assembly 100. The backshell assembly 102, according to various embodiments, is more compact than conventional backshell structures, and provides continued electromagnetic shielding by electrically grounding the wire assembly 140 to the bulkhead electrical connector 101 via the backshell assembly 102, as described in greater detail below. Thus, in various embodiments, not only do the backshell assemblies in accordance with the present disclosure occupy less volume and include fewer parts/components than conventional backshell structures, but the backshell assembly facilitates continuation of the electromagnetic shielding from a wire assembly through and into a bulkhead electrical connector, according to various embodiments. Additionally, the backshell assembly 102 directly electrically grounds the wire assembly 140 to the wall 50 (FIGS. 2 and 3) through which the bulkhead electrical connector 101 extends, thus facilitating anodization protection of the wall/hull 50.

The backshell assembly 102 generally includes a lug 110, a nut 120, and a ring 130, according to various embodiments. The lug 110 is configured to be coupled to the bulkhead electrical connector 101 (FIGS. 2 and 3) and the lug defines a central lug bore 115, according to various embodiments. For example, the lug 110 may have an annular, ring-like body with the central lug bore 115 extending there-through. The nut 120 and the ring 130 may be similarly configured in that each comprises an annular, ring-like body defining a central, pass-through bore. Accordingly, the nut 120 defines a central nut bore 125 and the ring defines a central ring bore 135, according to various embodiments. In an assembled state (e.g., FIG. 3), the nut 120 is coupled to the lug 110, with the ring 130 being retained by the nut 120 at least partially within the central lug bore 115 and/or the central nut bore 125, according to various embodiments. That is, the ring 130 may be generally confined within one or both of the central lug bore 115 and the central nut bore 125. Because each of the lug 110, the nut 120, and the ring 130 is annular, a wire assembly 140 (FIG. 3), or at least a wire 142 of the wire assembly 140, may extend through or at least partially into one or more of the bores 115, 125, 135 of the lug 110, the nut 120, and the ring 130, respectively, to be coupled to a terminal 107 of the bulkhead electrical connector 101.

In various embodiments, and with reference to FIG. 3, the wire assembly 140 includes at least one electrically conductive wire 142 and electromagnetic shielding 144. Accordingly, the term "wire assembly 140" refers generally to an electromagnetically shielded, electrically conductive member. The wire assembly 140 may be a wire harness, a cable harness, a cable assembly, a wiring assembly, a wiring loom, or other assembly of one or more electrical cables/wires. The wire assembly 140 may include other components, such as insulation or jacketing to protect the electrically conductive wire(s) 142 from abrasion, moisture ingress, and/or other potentially damaging mechanical occurrences. The electromagnetic shielding 144 is included in the wire assembly 140 to block electrical noise that is radiated or conducted as electromagnetic interference, which would otherwise disrupt the transmission of the electrical power/signal. That is, the electromagnetic shielding 144 is generally configured to reduce the level of transmission noise from electromagnetic interference and thus help to prevent signal degradation. The electromagnetic shielding 144 may be made from metallic material, such as aluminum and/or copper, among others. In various embodiments, the electromagnetic shielding 144 is in the form of a foil, a braid (e.g., a woven mesh), or both. The individual wires 142 may be wrapped in the electromagnetic shielding material 144, and/or an entire bundle of wires 142 may be wrapped in a layer of the electromagnetic shielding material 144.

In various embodiments, and with continued reference to FIG. 3, at least a portion of the electromagnetic shielding 144 may be situated so as to extend between a surface of the ring 130 and a corresponding surface of the lug 110 and/or the nut 120. That is, a section of the electromagnetic shielding 144 may be pulled-back and/or pulled away from the wire assembly 140, and may be positioned so as to be retained and engaged between the ring 130 and at least one of the lug 110 and the nut 120. For example, at least a portion of the electromagnetic shielding 144 may extend between a radially outward surface 131 (FIG. 1B) of the ring 130 and a radially inward surface 111 (FIG. 1B) of the lug 110 in an assembled state. The terms "radially outward" and "radially inward" are defined below with reference to the central longitudinal axis 105 of the bulkhead electrical connector 101. In various embodiments, the action of coupling the nut 120 to the lug 110, with the ring 130 positioned therebetween, causes the ring 130 to crimp, pinch, and/or otherwise compress and retain the electromagnetic shielding 144 between the ring 130 and the lug 110, thereby electrically grounding the wire assembly 140 to bulkhead electrical connector 101 via the lug 110, the nut 120, and/or the ring 130 of the backshell assembly 102. In various embodiments, the radially outward surface 131 of the ring 130 and the radially inward surface 111 of the lug 110 may have a tapering, conical shape. That is, the respective surfaces 131, 111 may converge radially inward, thereby enabling a compression/interference fit between the respective surfaces 131, 111, which may facilitate securely retaining the portion of the electromagnetic shielding 144.

As mentioned above, the lug 110 and the nut 120 may be directly coupled together, with the ring 130 being retained, housed, and/or compressed between the lug 110 and the nut 120 in the assembled state. Accordingly, the ring 130 is not directly coupled, attached, or fastened to the lug 110 or the nut 120, in accordance with various embodiments. Indeed, other than being potentially seated in direct contact/engagement with the lug 110 and/or the nut 120, the ring 130 may be untethered relative to the lug 110 and the nut 120 in the assembled state. Accordingly, the mechanical connection between the lug 110 and the nut 120 may be via threaded engagement, or another form of fastening structure. Similarly, the lug 110 may be mechanically coupled to the bulkhead electrical connector 101 via threaded engagement.

In various embodiments, and with specific reference to FIG. 1B, the lug 110 may have a first radially inward lug surface 111 that is non-threaded and that is configured to engage the corresponding, non-threaded, radially outward ring surface 131 of the ring, and the lug 110 may also have a second radially inward lug surface 112 that is threaded (e.g., that includes screw threads for mechanically coupling to another corresponding pattern of threads) for interfacing with a radially outward connector surface 106 (FIG. 2) of the bulkhead electrical connector 101 that is correspondingly threaded. The lug 110 may also have a radially outward lug surface 113 that is threaded and that is configured to interface with a radially inward nut surface 123 of the nut 120.

In various embodiments, and with momentary reference to FIG. 2, the respective central bores 115, 125, 135 may be coaxial with a central longitudinal axis 105 of the bulkhead electrical connector 101. In coaxial alignment, relative rotation between respective components may enable coupling or decoupling via the corresponding threaded surfaces, as described herein. As used herein, the terms "radially inward" and "radially outward" are used to refer to the position of items relative to the central longitudinal axis 105 of the bulkhead electrical connector 101. That is, a first component that is radially outward of a second component is farther from the central longitudinal axis 105 than the second component. Similarly, a surface that is radially outward is a surface that faces away from the central longitudinal axis 105 and a surface that is radially inward is a surface that faces toward the central longitudinal axis 105. Also as used herein, the terms "axially outward" and "axially inward" are used to refer to the position of items along the length of the central longitudinal axis 105 of the bulkhead electrical connector 101. Generally, an axial center is defined as the point along the central longitudinal axis 105 that is disposed in the middle of the wall 50 through which the bulkhead electrical connector 101 extends. Accordingly, a first component that is axially outward of a second component is generally farther away from the wall 50 than the second component.

In various embodiments, and with renewed reference to FIGS. 1A and 1B, the nut 120 includes a shoulder 124, and the shoulder 124 defines an aperture 126. The aperture 126 is an opening to the central nut bore 125. In various embodiments, a diameter 127 of the aperture 126 of the shoulder 124 of the nut 120 is less than a maximum external diameter 137 of the ring 130. Thus, in response to the nut 120 being drawn closer to the lug 110 along the corresponding threaded surfaces 123 (nut surface), 113 (lug surface), the ring 130 is unable to move through the aperture 126 and thus the ring 130 is pressed toward the lug 110 to pinch, crimp, or otherwise retain a section of the electromagnetic shielding 144 there-between. In various embodiments, and with reference to FIG. 3, the portion of the electromagnetic shielding 144 not only is situated to extend generally axially between the ring 130 and the lug 110, but the portion of the electromagnetic shielding 144 may be bent to also extend radially inward between an axially outward edge 134 of the ring 130 and the shoulder 124 of the nut 120. In various embodiments, the portion of the electromagnetic shielding 144 may further be bent again to extend axially outward through the aperture 126 to form a tail end 145 of the electromagnetic shielding 144. This tail end 145 may serve as a visible indicator of the electrical continuity between the wire assembly 140 and the bulkhead electrical connector 101, thereby enabling a user to ensure that the wire assembly 140 is proper electrically grounded to the bulkhead electrical connector 101 and/or the wall 50 via the backshell assembly 102. In various embodiments, a plurality of sections/portions of electromagnetic shielding may be pulled-back from the wire assembly 140, and each of these multiple sections may be positioned between the ring 130 and at least one of the lug 110 and the nut 120 to provide the aforementioned grounding benefit. In various embodiments, the plurality of sections of electromagnetic shielding are circumferentially distributed around the ring 130.

In various embodiments, the electrical connection assembly 100 further includes potting disposed around an interface between the one or more wires 142 and the terminal(s) 107 of the bulkhead electrical connector 101. The potting may be a shield against moisture ingress, may reinforce the mechanical strength to the electrical connections, and/or may otherwise act as a filler material for any of the empty/void space. The potting material may be an epoxy, a methacrylate, or a silicate, among others. For example, the potting material may be methyl-methacrylate.

Figure 4:
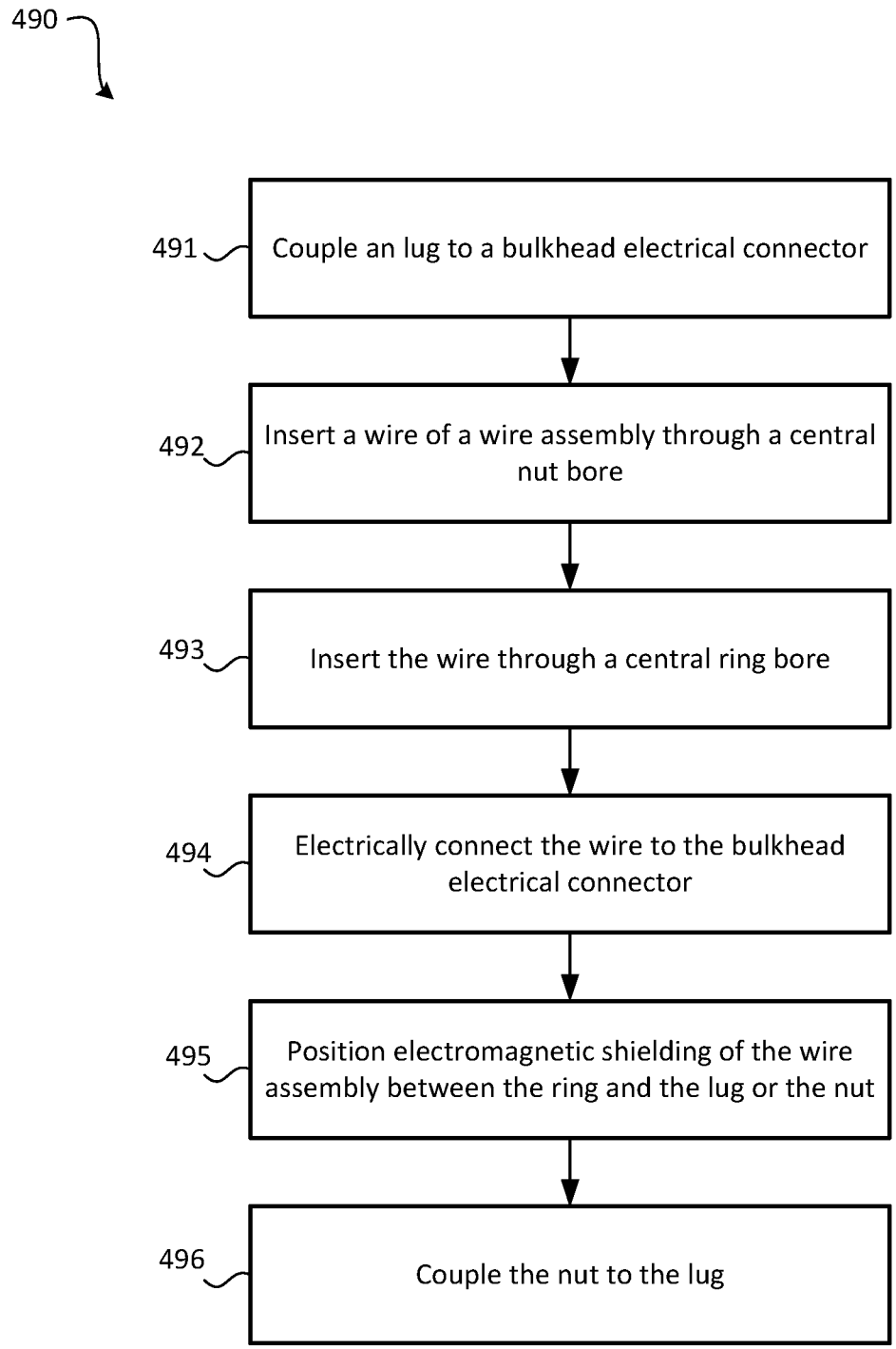
FIG. 4 is a schematic flow chart diagram of a method of connecting a wire assembly to a bulkhead electrical connector, in accordance with various embodiments.

In various embodiments, and with reference to FIG. 4, a method 490 of connecting the wire assembly 140 to the bulkhead electrical connector 101 is provided. The method 490 may include coupling the lug 110 to the bulkhead electrical connector 101 at step 491 and inserting the wire 142 of the wire assembly 140 through the central nut bore 125 of the nut 120 at step 492. Still further, the method 490 may include inserting the wire 142 through the central ring bore 135 of the ring 130 at step 493 and electrically connecting the wire 142 to the bulkhead electrical connector 101 at step 494. The method 490 may also include positioning at least a portion of the electromagnetic shielding 144 of the wire assembly 140 between the ring 130 and at least one of the lug 110 and the nut 120 at step 495. The method 490 may further include coupling the nut 120 to the lug 110 at step 496.

In various embodiments, step 495 is performed before step 496. That is, the electromagnetic shielding 144 may be positioned before engaging the nut 120 to the lug 110, thereby enabling the assembler to view and properly situate the electromagnetic shielding before obscuring his/her view with the nut 120. In various embodiments, step 492 is performed before step 493 but after step 491, thereby ensuring the ring 130 is disposed between the nut 120 and lug 110. In various embodiments, step 496 includes applying a compressive force to the ring 130 via the nut 120 to pinch the portion of the electromagnetic shielding 144 disposed between the ring 130 and at least one of the lug 110 and the nut 120. In various embodiments, step 495 includes pulling back a section of the electromagnetic shielding from around the wire(s) 142 of the wire assembly. In various embodiments, step 495 includes extending the portion of the electromagnetic shielding 144 radially inward between the axially outward edge 134 of the ring 130 and the shoulder 124 of the nut 120. Step 495 may further include extending the portion of the electromagnetic shielding 144 axially outward through the aperture 126 of the shoulder 124 of the nut 120.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Also, any reference to attached, fixed, connected, coupled or the like may include permanent (e.g., integral), removable, temporary, partial, full, and/or any other possible attachment option. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A backshell assembly for a bulkhead electrical connector, the backshell assembly comprising:
    a lug comprising a first radially inward lug surface, a second radially inward lug surface, and a radially outward lug surface, wherein the first radially inward lug surface is conical, the second radially inward lug surface is threaded, and the radially outward lug surface is threaded, wherein the first radially inward lug surface and the second radially inward lug surface together define a central lug bore, and wherein the lug is configured to be coupled to the bulkhead electrical connector via the second radially inward lug surface;
    a nut comprising a shoulder and a radially inward nut surface that is threaded, wherein the nut defines a central nut bore, and wherein the nut is configured to be coupled to the lug via engagement between the radially inward nut surface and the radially outward lug surface; and
    a ring comprising a radially outward ring surface and an axially outward edge, wherein radially outward ring surface is conical and the ring defines a central ring bore, and wherein the ring is configured to be retained by the nut at least partially within at least one of the central lug bore and the central nut bore;
    wherein an electromagnetic shielding of a wire assembly to be coupled to the bulkhead electrical connector is configured to be electrically grounded to the bulkhead electrical connector via the backshell assembly;
    wherein at least a portion of the electromagnetic shielding of the wire assembly is configured to be disposed and compressed between the radially outward ring surface and the first radially inward lug surface; and
    wherein the portion of the electromagnetic shielding is also disposed and compressed between the shoulder of the nut and the axially outward edge of the ring.

2. The backshell assembly of claim 1, wherein:
    the second radially inward lug surface is configured to be threadably engaged with the bulkhead electrical connector; and
    the radially outward lug surface is configured to be threadably engaged with the radially inward nut surface.

3. The backshell assembly of claim 1, wherein:
    the shoulder defines an aperture that is an opening to the central nut bore; and
    a diameter of the aperture of the nut is less than a maximum external diameter of the ring.

4. An electrical connection assembly comprising:
    a bulkhead electrical connector;
    a lug comprising a first radially inward lug surface, a second radially inward lug surface, and a radially outward lug surface, wherein the first radially inward lug surface is conical, the second radially inward lug surface is threaded, and the radially outward lug surface is threaded, wherein the first radially inward lug surface and the second radially inward lug surface together define a central lug bore, and wherein the lug is coupled to the electrical connector via the second radially inward lug surface;
    a nut comprising a radially inward nut surface that is threaded, wherein the nut defines a central nut bore, and wherein the nut is coupled to the lug via engagement between the radially inward nut surface and the radially outward lug surface;
    a ring comprising a radially outward ring surface, wherein the radially outward ring surface is conical and the ring defines a central ring bore, and wherein the ring is retained by the nut at least partially within at least one of the central lug bore and the central nut bore; and
    a wire assembly comprising at least one wire electrically connected to the bulkhead electrical connector, wherein:
        the at least one wire extends through the central nut bore, the central ring bore, and the central lug bore;
        the wire assembly comprises an electromagnetic shielding; and
        at least a portion of the electromagnetic shielding is directly engaged with and retained between the radially outward ring surface and the first radially inward lug surface of the lug.

5. The electrical connection assembly of claim 4, wherein:
    the second radially inward lug surface is threadably engaged with the bulkhead electrical connector; and
    the radially outward lug surface is threadably engaged with the radially inward nut surface.

6. The electrical connection assembly of claim 5, wherein:
    the nut comprises a shoulder;
    the shoulder defines an aperture that is an opening to the central nut bore; and
    a diameter of the aperture of the nut is less than a maximum external diameter of the ring.

7. The electrical connection assembly of claim 6, wherein:
    the bulkhead electrical connector comprises a central longitudinal axis;
    the central lug bore, the central ring bore, and the central nut bore are coaxial with the central longitudinal axis;
    the portion of the electromagnetic shielding extends radially inward between an axially outward edge of the ring and the shoulder of the nut; and
    the portion of the electromagnetic shielding extends axially outward through the aperture.

8. The electrical connection assembly of claim 4, wherein the ring is disposed within the central lug bore.

9. The electrical connection assembly of claim 8, wherein the ring is disposed within the central nut bore.

10. The electrical connection assembly of claim 4, wherein the portion of the electromagnetic shielding is a section of the electromagnetic shielding that has been pulled-back from being disposed around the at least one wire.

11. The electrical connection assembly of claim 10, wherein:
- the at least one wire is a first wire of a plurality of wires;
- the section of the electromagnetic shielding is a first section of a plurality of sections disposed respectively around the plurality of wires; and
- the plurality of sections are directly engaged with and retained between the ring and at least one of the lug and the nut.

12. The electrical connection assembly of claim 11, wherein the plurality of sections are circumferentially distributed around the ring.

13. A method of connecting a wire assembly to a bulkhead electrical connector, the method comprising:
- coupling a lug to the bulkhead electrical connector, wherein the lug defines a central lug bore;
- inserting a wire of the wire assembly through a central nut bore of a nut;
- inserting the wire through a central ring bore of a ring;
- electrically connecting the wire to the bulkhead electrical connector;
- positioning at least a portion of an electromagnetic shielding of the wire assembly between a radially outward ring surface of the ring and a radially inward lug surface of the lug;
- positioning the portion of the electromagnetic shielding of the wire assembly between an axially outward edge of the ring and a shoulder of the nut;
- coupling the nut to the lug via relative rotation between the nut and the lug, thereby retaining the ring at least partially within at least one of the central lug bore and the central nut bore such that the portion of the electromagnetic shielding is pinched between the ring and the lug as well as between the ring and the nut.

14. The method of claim 13, wherein positioning the portion of electromagnetic shielding comprises pulling back a section of electromagnetic shielding from around the wire.

15. The method of claim 14, wherein positioning the portion of electromagnetic shielding comprises:
- extending the portion of electromagnetic shielding radially inward between ]the axially outward edge of the ring and the shoulder of the nut; and
- extending the portion of electromagnetic shielding axially outward through an aperture of the shoulder of the nut.

16. The method of claim 13, wherein positioning at least the portion of electromagnetic shielding of the wire assembly between the ring and at least one of the lug and the nut is performed before coupling the nut to the lug.

* * * * *